May 4, 1954   T. LAUFER   2,677,429
STABILIZING DEVICE FOR HELICOPTERS AND THE LIKE FLYING MACHINES
Filed Jan. 28, 1948   11 Sheets-Sheet 1

Theodor Laufer
By Fraser, Myers & Manley
Att'ys.

May 4, 1954     T. LAUFER     2,677,429
STABILIZING DEVICE FOR HELICOPTERS AND THE LIKE FLYING MACHINES
Filed Jan. 28, 1948     11 Sheets-Sheet 5

May 4, 1954   T. LAUFER   2,677,429
STABILIZING DEVICE FOR HELICOPTERS AND THE LIKE FLYING MACHINES
Filed Jan. 28, 1948   11 Sheets-Sheet 6

May 4, 1954   T. LAUFER   2,677,429
STABILIZING DEVICE FOR HELICOPTERS AND THE LIKE FLYING MACHINES
Filed Jan. 28, 1948   11 Sheets-Sheet 8

May 4, 1954     T. LAUFER     2,677,429
STABILIZING DEVICE FOR HELICOPTERS AND THE LIKE FLYING MACHINES
Filed Jan. 28, 1948     11 Sheets-Sheet 11

Patented May 4, 1954

2,677,429

UNITED STATES PATENT OFFICE 2,677,429

STABILIZING DEVICE FOR HELICOPTERS AND THE LIKE FLYING MACHINES

Theodor Laufer, Paris, France, assignor to Societe Nationale de Constructions Aeronautiques du Sud-Quest (Societe Anonyme), Paris, France, a company of France Application January 28, 1948, Serial No. 4,886

Claims priority, application France February 7, 1947

8 Claims. (Cl. 170—160.13)

It is a known fact that helicopters when under stationary flying conditions are not stable, in other words they are submitted to oscillations of increased amplitude if the pilot does not execute at the required moment the correct operation for damping such oscillations. Similarly the path of the machine at cruising flight is generally a wavy line. In order to make the phenomena underlying such oscillations more apparent, it will be of advantage to consider that in spite of the universal joint connecting the rotor with the pylon of the machine, any relative displacement of the pylon with reference to the rotor has a tendency to shift the latter as if the connection between the two parts were to some extent rigid. As a matter of fact, the arrangement controlling the incidence of the blades associated with the pylon modifies, by reason of the variation in its relative position, the conditions of rotation of the rotor, that is the position of its axis of conicity with reference to the pylon. It may be proved that this variation in the adjustment of the rotor has for its consequence to increase the variation in the relative position that has produced it; in other words, during flight the equilibrium between the relative position of the rotor with reference to the cabin carrying the pylon is an unstable one.

The present invention has for its object to practically do away with all the oscillations during flight under stationary conditions while improving stability during forward flight.

The condition that is necessary and sufficient for reaching said result consists in that the rotor should follow the inclination of the machine with a suitable lag that is much greater than that naturally produced with a non-stabilised helicopter. However, it is desirable for the lag between any desired control and the response of the rotor to be as small as possible in order that the apparatus may remain easily controlled.

The first condition may be satisfied through an increase in the inertia of the rotor, but the aircraft will then become too heavy and the second condition would not be satisfied.

It has already been proposed to make use of the inertia of a gyroscope that acts on the piloting plane, the gyroscope defining the plane of correction. This arrangement has proved satisfactory on small apparatuses with a two blade rotor, but it seems to be applicable only with difficulty to more important apparatuses.

According to the present invention, there are inserted, in the transmission controlling the distribution of pitches and in its connections with the rotor and the pylon, correcting members the position of which is submitted to the action of the rocking of the plane of the rotor with reference to the axis of the pylon, whereby said rocking may lead only with a predetermined lag to a modification in the incidence of the blades corresponding to the variation in the relative position between the rotor and the means controlling the pitch angle.

As a matter of fact, by reason of its inertia, the rotor has a tendency to retain its general arrangement in space. Instead of acting directly on the blades for the control of their pitch, there are inserted in the path of the control means, levers at the rate of one for each blade as a rule, and one of the pivoting points thereof is connected directly or indirectly with the blade while the other is located on a correcting plate the location of which may vary with reference to the pylon through a rocking of the rotor by reason of the inertia of the latter. Thus, when the plane of the rotor rocks, the control means of the pitch angle remaining in the same position with reference to the pylon, the displacement of the correcting plate prevents this rocking from acting immediately on the incidence of the blades. The piloting plane is no longer directly defined by the pitch control member and is defined on the contrary by the associated position of said member and of the swash plate. The plane of the latter defines thus a plane of correction for the plane of piloting.

The modification in the position of the correcting or swash plate is obtained by controlling the position of the plate through that of the blades of the rotor or of the hub of the latter.

In a preferred form of execution, the connecting system is constituted by elastic means associated with dampers that brake the action thereof. In the case of a rapid rocking movement, these dampers increase the rigidity of the connection between the swash plate and the transmission connected with the rotor that ensures the displacement of said plate so as to deform thus the elastic means. If the rocking action continues, the elastic means return into their original shape and urge the swash plate thus into its original position in antagonism with the action of the dampers.

In brief, the arrangement according to the invention has for its action an increase in the apparent inertia of the rotor or in other words it allows during an oscillation of the fuselage an increase in the time required for said modification, through a reaction of the control of the pitch angle, of the incidence of the rotor blade and consequently of the direction in space of the axis of conicity and of the thrust of the rotor.

In order to prevent under such conditions a rotor improved in accordance with the invention, from always behaving as a very heavy rotor, means may be provided for locking at will the correcting plate in a manner such that the levers mentioned hereinabove act as transmission levers so as to allow an instantaneous response of the rotor to control means operated by the pilot.

The following description to be read with reference to accompanying drawings, that is given by way of example, without any binding sense as to the scope of the invention will allow a proper understanding of the arrangement the principles of which have been disclosed hereinabove. The features appearing in the drawings and in the specification form of course part of the invention within the scope of accompanying claims. In said drawings:

Figs. 16 and 17 are diagrams corresponding respectively to a disturbance and to a control operation performed by the pilot on the rotor shown cross-sectionally and in plan view in Figs. 18 and 19, Fig. 18 being a cross-section through line XVIII—XVIII of Fig. 19.

Figs. 20 and 21 show a simplified diagram of an improved rotor.

In the different above figures, the members playing similar parts carry the same reference numbers.

Figure 1:
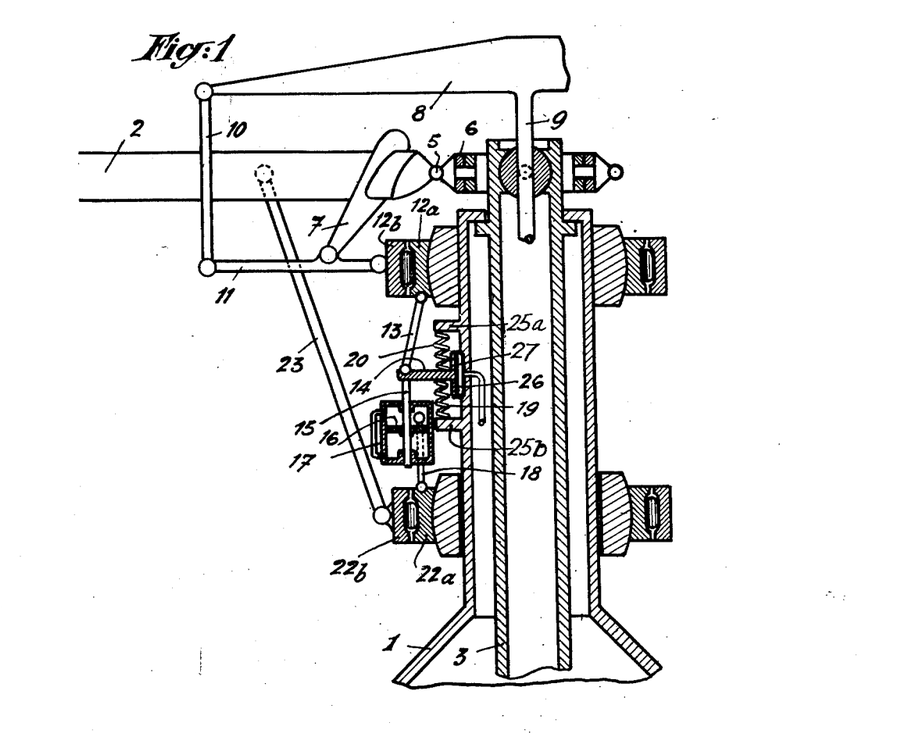
Fig. 1 is an example of execution relating to the case of a mechanically driven rotor.

In Fig. 1, 1 indicates a pylon fast with the fuselage of the aircraft whose rotor, one blade 2 of which is shown, is driven by means of a hollow shaft 3 axially arranged inside the pylon 1 and connected to the blades 2 through a cardan or universal joint 6 which drives them in rotation while allowing oscillation thereof relatively to the shaft 3. The blades are, moreover, pivotally mounted at 5 so that their individual pitch may be adjusted. Each blade 2 is provided with a pitch lever horn 7 controlling a cyclic change in pitch through the agency of a spider support 8 controlled by hand through the rod 9. The transmission includes a connecting link 10 hinged at one end of a lever 11, itself hinged at its other end on a swash-plate 12a, 12b comprising an inner annular portion 12a mounted for oscillation with respect to the pylon and an outer annular portion 12b rotating around 12a in the same plane as the latter. The position of the portion 12a is controlled by a resilient damping connection described hereafter and depends on the position of a further swash-plate 22a, 22b similar to the former one but slidingly mounted on the pylon. The outer annular rotary portion 22b is driven by connecting rods 23 pivotally linked to the blade 2.

The elastic damping connection includes, in the form of execution illustrated, a rod 13 connected through one end with the non rotary portion 12a of the swash plate 12a, 12b and through the other with the rod 15 of the piston 16 that moves inside the damping cylinder 17 in a manner known per se. Said cylinder 17 is connected with the ring portion 22a through connecting rod 18. The rod 13 bears on a flange 14 urged by opposite springs 19 and 20 abutting against stops 25a and 25b which are integral with the pylon 1.

Figure 2:
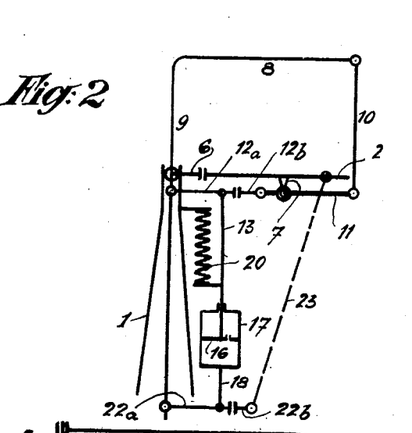
Figs. 2 and 3 are operative diagrams corresponding to said example. The first corresponds to normal flight and the second to a rocking of the machine with respect to the rotor.
Figure 3:
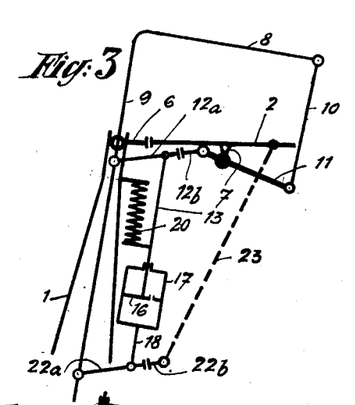

Fig. 2 illustrates diagrammatically the same arrangement in its normal position while Fig. 3 shows it when operating during an inclination of the machine and consequently of the pylon 1.

The spider support 8 follows the movement of the pylon and assumes a slanting position and carries along with it the connecting link 10. But at the same time, by reason of the inertia of the rotor, the ring 22a—22b assumes a slanting position under the action of the connecting rod 23 and acts consequently through the agency of the yielding connections 13 to 18 on the slope of the swash plate 12a—12b. Therefore the outer end of the lever 11 moves downwardly while the inner end rises and the horn 7 is substantially unaffected.

The greater angular rocking speed of the plane of the rotor, the higher the resistance of the damper 17 and the greater the distortion of the spring; hence the angular displacements of the swash-plate 12a, 12b are considerable. Conversely, if the rocking is slow, the piston of the damper has the time of moving so that the spring 20 is compressed only to a small extent while the angular displacement of the swash plate 12a—12b is small. The displacement would be zero if the movements were infinitely slow.

In order to allow a rapid sloping movement of the rotor when required, it is possible to lock the swash-plate device. In the example illustrated, there is provided a brake acting on one flange 14; said brake comprising an elastic chamber 26 (Fig. 1) that may be inflated with compressed air inserted between the pylon 1 and a cylinder 27 rigid with the flange 14. The admission of compressed air may be operated directly by means of a knob carried on a lever controlling the apparatus.

Figure 4:
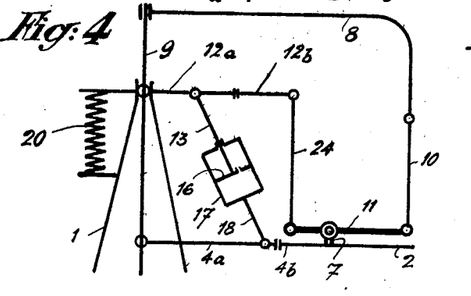
Figs. 4 and 5 are diagrams similar to those of Figs. 2 and 3 for a modified form of execution illustrated respectively in cross-sectional and in plan view in Figs. 6 and 7, the cross section of Fig. 6 being obtained through line VI—VI of Fig. 7.
Figure 5:
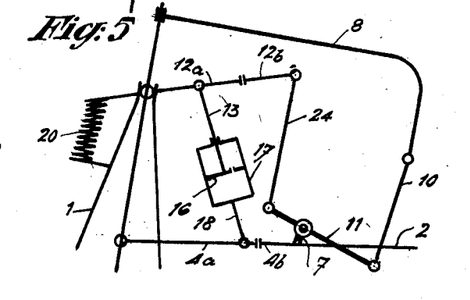
Figure 6:
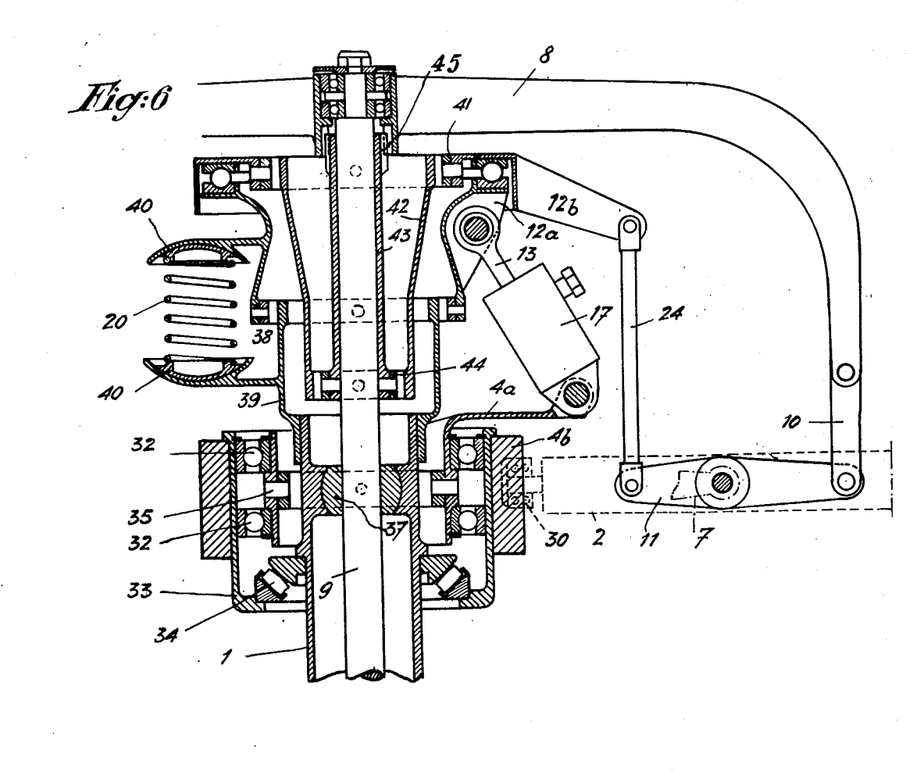
Figure 7:
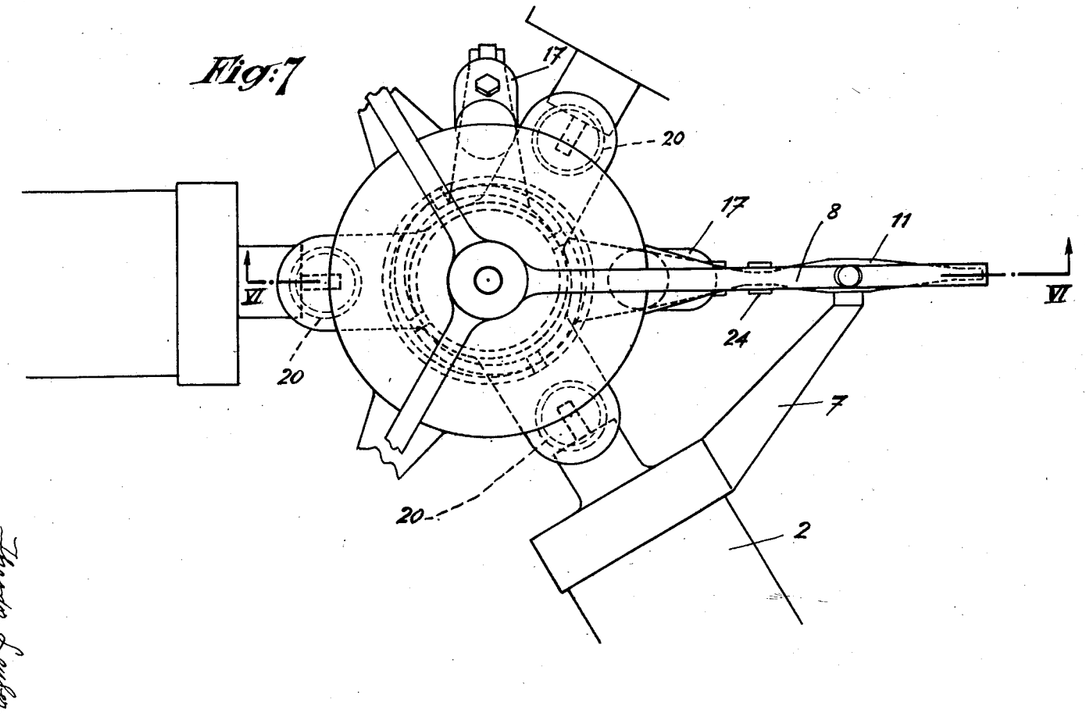

In the example illustrated diagramatically in Figs. 4 and 5 and structurally in Figs. 6 and 7, the connecting rods 23 are dispensed with and the damping system 13 to 18 are substituted therefor.

In this case, the hub of the rotor includes a rotary part 4b and a nonrotary part 4a adapted to rock in a manner such that its axis may remain constantly in substantial coincidence with the axis of conicity of the rotor. The inclination of the swash plate 12a—12b is transmitted by the connecting rod 24 from the rotary part 12b of said plate to the lever 11 acting on the arm 7 governing the angle of incidence of the blade.

Fig. 4 shows diagrammatically the device in normal flight and Fig. 5 the same device during an inclination of the craft and consequently of the pylon 1. As explained with respect of Fig. 3, during such an inclination, the spider 8, 10 follows the movement of the pylon and carries along the link 19. Owing to the inertia of the rotor, the rotor hub comprising a rotary part 4b and a nonrotary part 4a assumes a slanting position with respect of the pylon axis. For a relatively great speed of inclination, the damper 17 shows a high resistance and may rock through rods 13 and 18 the correcting plate 12a, 12b against spring 20. Therefore the outer end of lever 11 is moved downwardly by link 19 while the inner end of said lever is raised by the link 24 in such manner that the arm 7 is substantially not disturbed.

According to a practical embodiment of the arrangement, as shown in Figs. 6 and 7, each blade 2 is mounted on a roller bearing 30 carried in its turn by the oscillating hub including again a rotary part 4b and a non rotary part 4a that are arranged coaxially through the interposition of two ball bearings 32. The rotary part 4b includes a depending member 33 transmitting the thrust of the rotor to a roller bearing 34, the rollers of which are barrel shaped. Such a rotor may be driven by means of rockets, reaction jet nozzles, small motor-driven propellers or by means of a homokinetical joint connecting the member 33 to a driving shaft. The non rotary part of the hub is held against rotation by a Cardan joint 35 connected with the pylon. Said non rotary part 4a is provided with the dampers 17 located at 90° from one another and acting on the non rotary part 12a of the swash plate that is connected by means of a Cardan joint 38 with a member 39 carried by the pylon. The springs 20 the number of which is equal to three, act through spherical surfaces 40 on the plate 12a and urge the latter back into its mean position. The rotary part 12b of the swash plate receives a rotary movement round the axis of the rotor through the agency of a Cardan transmission 41—42—43—44 that is driven by an already rotating member constituted in the case illustrated by the spider support 8 engaging part 43 of the Cardan joint through flutings 45. The axial rod 9 does not rotate and merely rocks inside the pylon 1 through the agency of the ball and socket 37. Part 43 is slidable on rod 9 to permit free tilting of the universal joints at 38 and 41.

Figure 8:
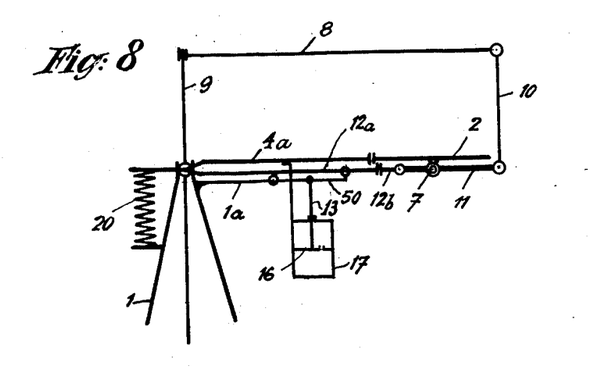
Figs. 8, 9 and 10 are diagrams corresponding respectively to normal flight during an inclination of the machine and while a control operation is being executed for modifying the pitch angle of a rotor that is stabilised in accordance with the invention, in the case of a further embodiment.
Figure 9:
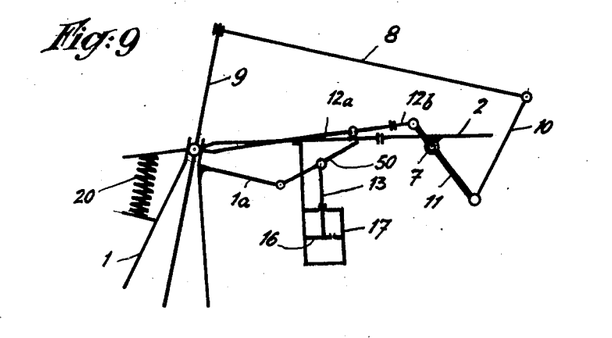
Figure 10:
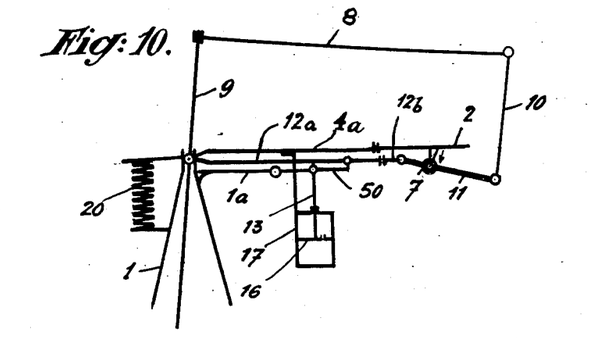
Figures 14, 18:
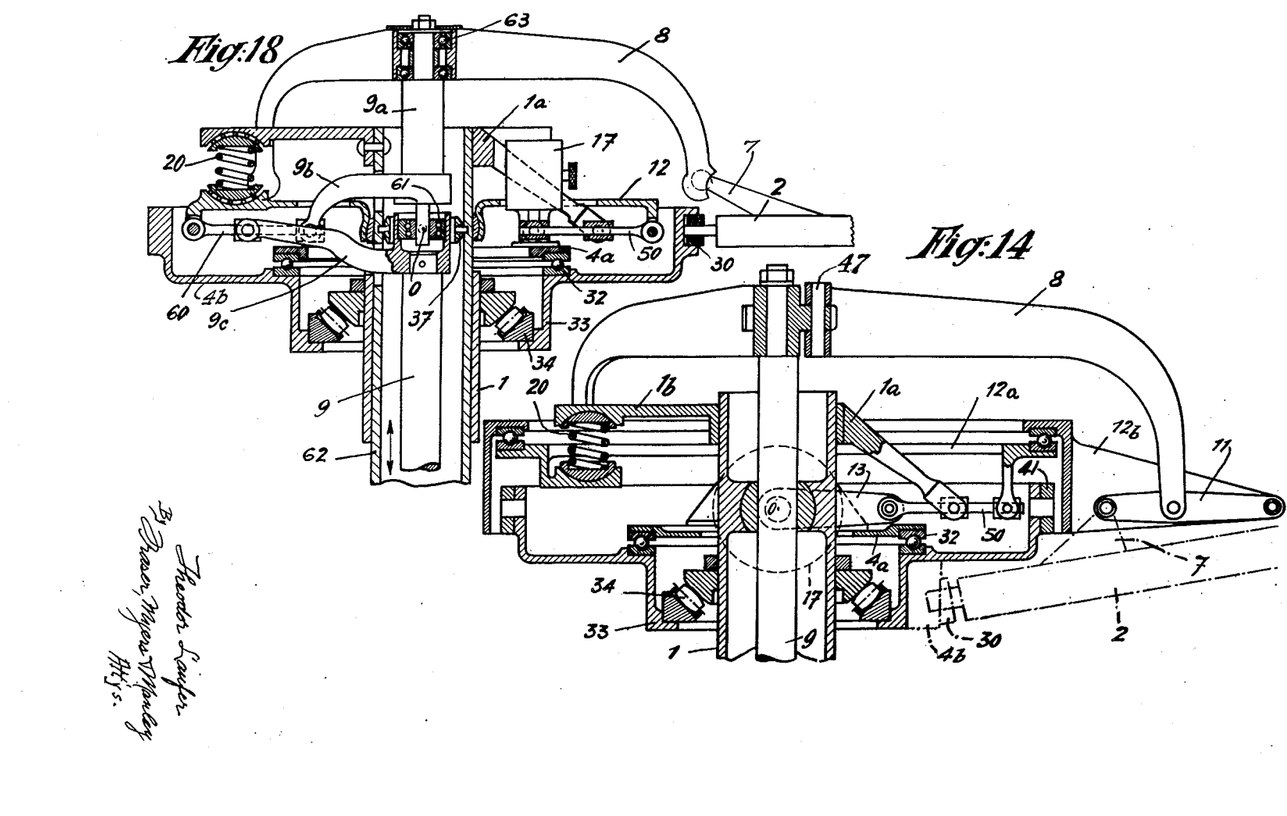
Fig. 14a shows a modification of the invention illustrated in Figs. 14 and 15 for realizing the device diagrammatically shown in Figs. 8, 9 and 10.
Figures 14A, 22:
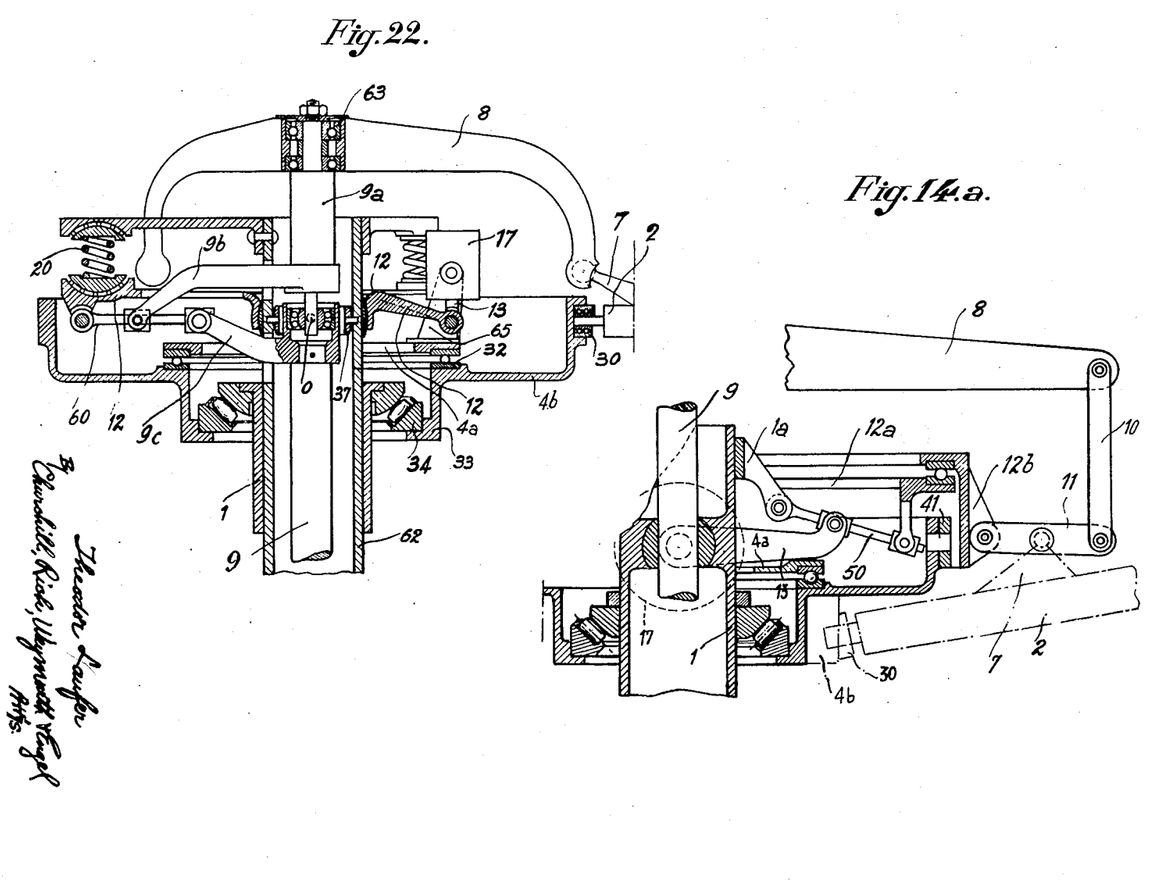
Fig. 22 is a diagrammatic cross section of the embodiment of the invention shown in Figs. 20 and 21.

A further form of the invention is shown in Fig. 14a and is illustrated diagrammatically in Figs. 8, 9 and 10. Fig. 8 shows the position for flight at a stationary point without any movement while Fig. 9 corresponds to stationary flight during an oscillation. In this embodiment of the invention, as shown in particular in Fig. 14a, the damper is not directly connected to the part 12a of the swash-plate, but through the agency of a lever 50, an intermediate point of which is hinged to the rod 13, and the ends of which are respectively hinged to the swash-plate element 12a and to a support 1a fast with the pylon 1. Furthermore, the damper 17 is fast with the non-rotary part 4a of the oscillating hub of the rotor. As shown on Fig. 9, during an inclination of the craft, the lever 1a acts on the end of the lever 50 which is pivotally carried by the rod 13. Owing to the resistance of the damper 17, said pivot remains practically stationary so that the outer end of lever 50 raises the non rotary part 12a of the correcting plate. Thus during the inclination, the inner end of lever 11 is raised while the outer end is moved downwardly and the arm 7 is not disturbed.

Fig. 10 shows the operation of the control of the cyclic modification in pitch with such an arrangement. During hand control of the pitch as shown on Fig. 10, the spider support 8 is slanted by the pilot. Owing to the resistance of damper 17 and spring 20 the outer end of lever 11 is moved downwardly in the example shown. Thus the pitch lever 7 is also moved downwardly and the pitch of the blades is cyclicly modified. But by reason of the reduction in the amplitude of movement of the horn 7 with reference to the lever 11, it is necessary to increase the inclination of the spider support.

Figure 11:
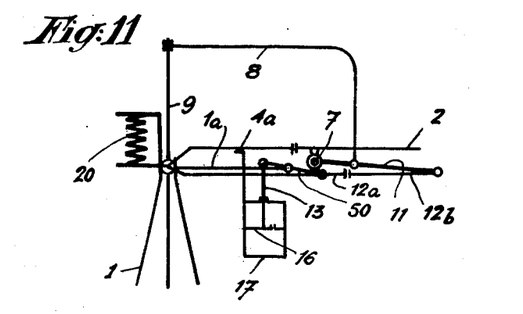
Figs. 11, 12 and 13 are similar diagrams for a modification of the preceding rotor, which modification is shown respectively in cross section and in plan view in Figs. 14 and 15, Fig. 14 being a cross section through line XIV—XIV of Fig. 15.
Figure 12:
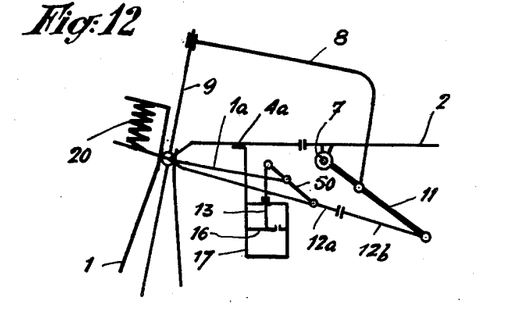
Figure 13:
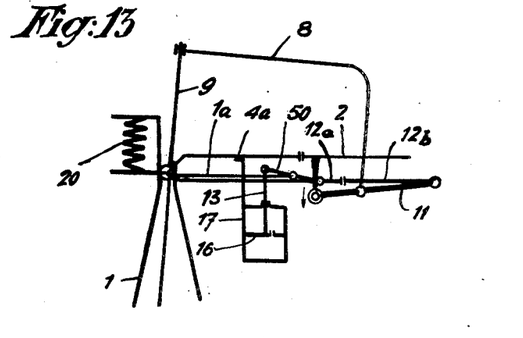

In Figs. 11, 12 and 13, the sequence of the pivoting points on the lever 50 is changed and consequently the swash plate executes a movement opposite to that referred to in the preceding case, which leads to a corresponding modification in the sequence of the pivoting points on the lever 11 in order to obtain a correct operation. Figs. 11, 12 and 13 correspond respectively to Figs. 8, 9 and 10 and need no further explanation. In this case, the movement of the spider support is amplified through the lever 11 instead of being reduced which allows providing a rigid spider support, in other words the connecting rod 10 may be omitted.

Figure 15:
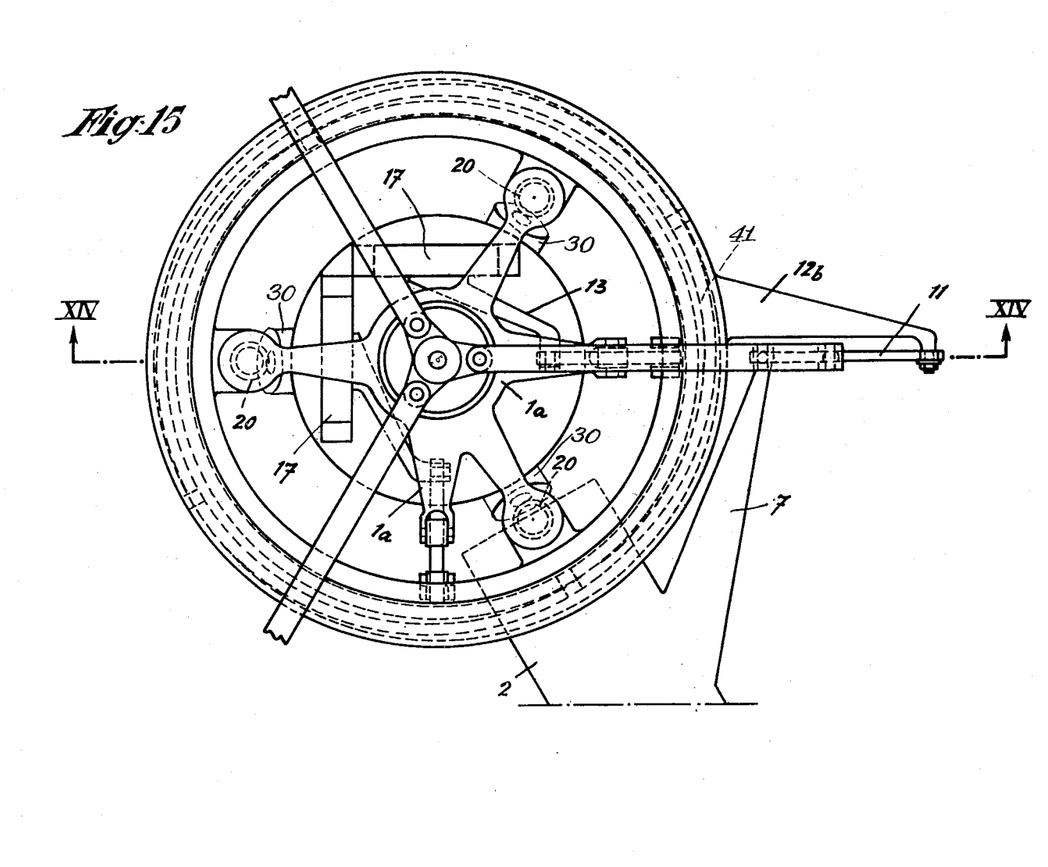

Figs. 14 and 15 show respectively in cross-sectional and in plan view a practical embodiment of the device diagrammatically shown on Fig. 11 while Fig. 14a shows diagrammatically the alteration of the right upper part of Fig. 14 for obtaining the device shown by Fig. 8. It is apparent that the sequence of the pivoting points of the levers 50 and 11 on Figs. 14 and 14a corresponds respectively to Figs. 11 and 8. The correcting plate 12a, 12b rocks round the same point O as the rotor. The dampers 17 are in this case of the rotary piston type and are secured to the non-rotary part 4a of the rotor hub which non-rotary part is held in position through a roller bearing 32.

As precedingly, the rotary part 4b of the hub includes a depending member 33 rocking and rotating with reference to the pylon by reason of the presence of a roller bearing 34, the rollers of which are barrel shaped. The rotary part 12b of the swash plate 12 rotates in unison with the hub 4b through the agency of the Cardan joint 41. Lastly, the arms of the spider support 8 are pivotally secured round the axis 47 carried at the end of the axial rod 9 so as to follow the variation of the drag angle of the blades.

Figure 19:
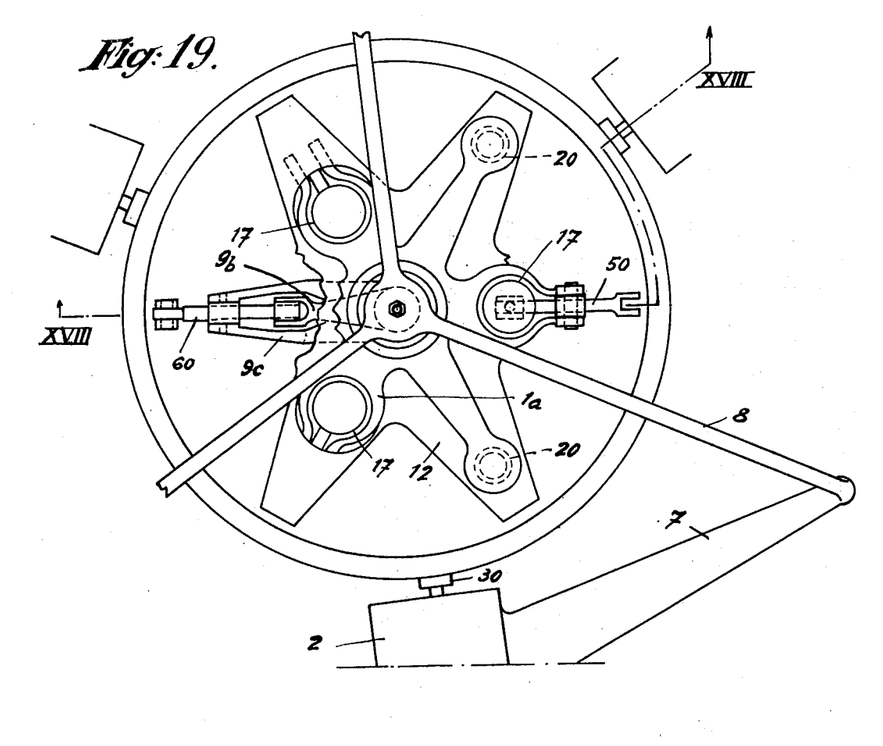

Another form of execution is illustrated diagrammatically in Figs. 16 and 17 while the cross section thereof is shown in Fig. 18 and in plan view in Fig. 19. In this case, the rod of the spider support is formed by two pivoted elements 9 and 9a while the spider support is also formed of two elements. The levers 11, which in the previously described modification are carried by the end of arms 8 of the spider, are here replaced by levers 60 connecting the arms 9c of the lower spider member with the arms 9b of the upper spider member. Under such conditions, if the arms 8 are as illustrated in Fig. 18 pivotally secured inside the bearings 63 at the end of the rod 9a the correcting plate comprises only a non-rotary part 12.

Assuming as shown on Fig. 16 an inclination of pylon 1 lower part 9 of the controlling rod 9, 9a follows the movement of the pylon while upper part 9a remains stationary. As a matter of fact, rocking of the pylon slants the correcting plate 12 through lever 50 against springs 20 on account of the rigidity of damper 17. Relative inclination of plate 12 is greater than that of pylon. Thus the outer end of lever 60 is raised to a greater extent than the connecting point of said lever to arm 9c and the connecting point of said lever to arm 9b remains stationary. When acting on rod 9, as shown on Fig. 17, the inclination of part 9a is amplified through lever 60 because plate 12 remains stationary owing to resistance of damper 17 and springs 20.

In the practical embodiment illustrated in Figs. 18 and 19, the rod 9 is adapted to rock round the Cardan member 37 while the rod 9a of the spider support rocks round the socket joint 61 inside which it may slide. The Cardan member 37 and the socket joint 61 have as a center of oscillation the point O which forms also the center of oscillation for the plate 12.

The pitch may be modified for all the blades simultaneously by causing the tube 62 carrying the whole control means and the arms 1a to slide. In contradistinction with the preceding forms of execution, the arrangement illustrated in Fig. 18 is provided as shown in Fig. 19 three times in azimuths that are spaced 120° from one another. But it is also possible to only provide for a duplication of the arrangement the elements of which are at 90° from one another without any sliding of the tube 62 if other means are provided for the general control of the pitch, for instance by raising the upper spider support 9a inside the sliding socket joint 61 through means such as screws, levers or cables, which means are easy to imagine as the rod 9a does not rotate with reference to the pylon.

A simplified form of execution is illustrated in diagrams on Figs. 20 and 21 and in practical embodiment on Fig. 22. In this case, the plane of the swash plate 12 is constituted so as to be directly controlled by the non-rotary part 4a of the hub through the agency of the dampers 17 said dampers are pivotally carried by brackets 65 (Fig. 22) fast with the non-rotary part 4a of the hub and rods 13 are directly connected to the plate 12. Consequently said plate 12 rocks through the same angle as the plane of the rotor when the dampers remain rigid. As in the case of Fig. 18, the spider 3 is not directly connected to the manual control rod 9 but is supported for free rotation on an axle 9a which constitutes an extension of rod 9 and is articulated thereto at O, the rod 9 being itself articulated at 37 to the tubular member 62 crossing the pylon 1. The rod 9 and the axle 9a are respectively fast with arms 9c and 9b which are connected to one another by the radially extending lever 60. This lever 60 is hinged at one end to arm 9c and is slidably and pivotally connected to the tip of arm 9b. Furthermore, the other end of the lever 60 is hinged to the swash-plate 12.

During an inclination of the pylon 1 as shown on Fig. 20, the correcting plate remains initially parallel to the hub 4. Owing to lever 60 the rocking of arm 9b is reduced with respect to the rocking of the arm 9c fast with the rod 9 which follows the inclination of the pylon.

This arrangement leads to allowing a certain shifting of the control lever 7 when the machine assumes a sudden slope. Its possibilities are thus less widely extended than those of the preceding arrangements; but however it is possible in certain cases that the stability thus obtained is sufficient.

It will be remarked moreover that in this case as shown on Fig. 21 during manual control the sloping angle of the rod 9a is reduced instead of being increased as in the case of Fig. 19. As a matter of fact, when comparing Fig. 18 and Fig. 22, the connecting points of lever 60 with arms 9b and 9c are permuted. For the remainder (except canceling of lever 50 in Fig. 22) the two embodiments are identical.

Obviously many modifications may be brought to the above described arrangement chiefly by substituting equivalent technical means to those described without unduly widening thereby the scope of the invention as defined in accompanying claims.

I claim:

1. In a helicopter having a pylon, a sustaining rotor composed of several blades connected to a hub capable of rotating and oscillating freely with respect to said pylon, a blade pitch controlling system comprising a horn connected to each blade and a control member, the combination of a swash-plate mounted on the said pylon and capable of oscillating thereabout; resilient return means linking the said swash-plate to the said pylon in such a manner as to cause the said swash-plate to return to its initial position with respect to the said pylon, when the said swash-plate has moved from that position; linking means including a damping device disposed between the said rotor and the said swash-plate, in such a manner as to permit different positions of the said swash-plate with respect to the said hub and to cause a resistance to every change from any of said positions, this resistance varying with the rate of the said change; said blade pitch controlling system further comprising a lever pivotally connected at one point to said swash plate, at a second point to said control member and at a third point to said horn.

2. The combination of claim 1 wherein the hub comprises a non-rotary part capable of oscillating about the pylon, and a rotary part adapted to revolve about the said non-rotary part and pivotally connected to the blades; the swash-plate comprises a non-rotary part capable of oscillating about the said pylon and a rotary part adapted to revolve about the said non-rotary part and pivoted to the lever, the resilient return means links the said non-rotary part of the said swash-plate to the said pylon; and the linking means is disposed between the said two non-rotary parts.

3. The combination of claim 2 wherein the linking means comprises at least two dampers supported by the non-rotary part of the hub and two generally radial rods angularly arranged about the pylon, each rod being hinged at one point to the said pylon, at a second point to the non-rotary part of the swash-plate and at a third point to one of the said dampers.

4. The combination of claim 1 wherein the hub comprises a non-rotary part capable of oscillating about the pylon and a rotary part adapted to revolve about the said non-rotary part and pivotally connected to the blades; the swash-plate is non-rotary; the linking means is disposed between the said non-rotary part of the hub and the said swash-plate; the blade pitch control system includes an axle supporting a spider and allowing free rotation of the said spider relatively thereto; and the lever extends substantially radially with respect to the said pylon.

5. The combination according to claim 4 wherein the rotary part of the hub is a cup-shaped member.

6. The combination according to claim 4, wherein the linking means, comprise at least two dampers carried by the non-rotary part of said hub and at least two substantially radially extending rods angularly disposed about the pylon, each rod being hinged at one point thereof to the pylon, at a second point thereof to said swash-plate and at a third point thereof to one of said dampers whereby said rods provide a leverage link connection between said swash-plate and said hub.

7. The combination according to claim 4, wherein the linking means, comprise at least two dampers angularly disposed about the pylon, one end of said dampers being connected to said swash-plate and the other end to said rotor hub.

8. In a helicopter having a pylon, a sustaining rotor composed of several blades connected to a hub capable of rotating and oscillating freely with respect to said pylon, the combination of a swash-plate mounted on the said pylon and capable of oscillating thereabout; resilient means linking the said swash-plate to the said pylon in such a manner as to cause the said swash-plate to return to its initial position with respect to the said pylon when the said swash-plate has moved from that position; linking means including a damping device disposed between the said rotor and the said swash-plate, in such manner as to permit different positions of the swash-plate with respect to the said hub and to cause a resistance to every change from any of said positions, this resistance varying with the rate of said change; a blade pitch control device, a control member for said device and a lever pivotally connected at one point with said swash-plate, at a second point with said pitch control device and at a third point with said control member.

References Cited in the file of this patent

UNITED STATES PATENTS

| Number | Name | Date |
| --- | --- | --- |
| 1,800,470 | Oehmichen | Apr. 14, 1931 |
| 1,828,783 | Oehmichen | Oct. 27, 1931 |
| 2,088,413 | Hafner | July 27, 1937 |
| 2,256,635 | Young | Sept. 23, 1941 |
| 2,368,698 | Young | Feb. 6, 1945 |
| 2,439,089 | Hodson | Apr. 6, 1948 |
| 2,444,070 | Stanley | June 29, 1948 |